(12) United States Patent
Bingham et al.

(10) Patent No.: US 12,566,942 B2
(45) Date of Patent: Mar. 3, 2026

(54) SYSTEM AND METHOD FOR GENERATING PARAMETRIC ACTIVATION FUNCTIONS

(71) Applicant: Cognizant Technology Solutions U.S. Corporation, College Station, TX (US)

(72) Inventors: Garrett Bingham, Oakland, CA (US); Risto Miikkulainen, Stanford, CA (US)

(73) Assignee: Cognizant Technology Solutions US Corp., College Station, TX (US)

( * ) Notice: Subject to any disclaimer, the term of this patent is extended or adjusted under 35 U.S.C. 154(b) by 1234 days.

(21) Appl. No.: 17/399,470

(22) Filed: Aug. 11, 2021

(65) Prior Publication Data

US 2022/0051076 A1     Feb. 17, 2022

Related U.S. Application Data

(60) Provisional application No. 63/064,483, filed on Aug. 12, 2020.

(51) Int. Cl.
G06N 3/04 (2023.01)
G06N 3/084 (2023.01)

(52) U.S. Cl.
CPC ............... G06N 3/04 (2013.01); G06N 3/084 (2013.01)

(58) Field of Classification Search
CPC .......... G06N 3/04; G06N 3/084; G06N 3/048; G06N 3/086
See application file for complete search history.

(56) References Cited

U.S. PATENT DOCUMENTS

| | | | | |
|---|---|---|---|---|
| 10,929,748 B1 * | 2/2021 | Morten | .................. | G06F 18/29 |
| 11,804,112 B2 * | 10/2023 | Voss | ..................... | G06Q 20/322 |
| 12,039,453 B2 * | 7/2024 | Hicks | ..................... | G06N 3/086 |
| 2003/0014378 A1 * | 1/2003 | Goodnight | ............. | G06N 3/045 |
| | | | | 706/26 |
| 2017/0286830 A1 * | 10/2017 | El-Yaniv | ................ | G06N 3/045 |
| 2019/0073591 A1 | 3/2019 | Andoni | | |
| 2019/0138899 A1 * | 5/2019 | Hoshizuki | ................ | G06N 3/08 |
| 2019/0180181 A1 * | 6/2019 | Lilley | ..................... | G06N 3/126 |
| 2019/0378210 A1 * | 12/2019 | Merrill | ..................... | G06N 5/01 |

(Continued)

OTHER PUBLICATIONS

Bingham, et al., "Discovering Parametric Activation Functions," published at arXiv: 2006.03179v4, Jan. 30, 2021.

(Continued)

*Primary Examiner* — Mariela Reyes
*Assistant Examiner* — Evel Honore
(74) *Attorney, Agent, or Firm* — Dawn-Marie Bey; Bey & Cotropia PLLC

(57) ABSTRACT

The embodiments describe a technique for customizing activation functions automatically, resulting in reliable improvements in performance of deep learning networks. Evolutionary search is used to discover the general form of the function, and gradient descent to optimize its parameters for different parts of the network and over the learning process. The new approach discovers new parametric activation functions which improve performance over previous activation functions by utilizing a flexible search space that can represent activation functions in an arbitrary computation graph. In this manner, the activation functions are customized to both time and space for a given neural network architecture.

17 Claims, 6 Drawing Sheets
(6 of 6 Drawing Sheet(s) Filed in Color)

(56)          References Cited

U.S. PATENT DOCUMENTS

| | | | | |
|---|---|---|---|---|
| 2020/0005143 | A1* | 1/2020 | Zamora Esquivel | .... G06N 3/08 |
| 2020/0012900 | A1* | 1/2020 | Walters | ............... G06F 11/3684 |
| 2020/0063665 | A1* | 2/2020 | Ma | ............................ G06N 3/08 |
| 2020/0175378 | A1 | 6/2020 | Mcdonnell | |
| 2020/0202214 | A1* | 6/2020 | Peranandam | .......... G06N 3/082 |
| 2020/0234100 | A1 | 7/2020 | Ramanan | |
| 2021/0073028 | A1* | 3/2021 | Li | ......................... G06F 9/5011 |
| 2021/0142171 | A1* | 5/2021 | Jung | ...................... G06N 3/084 |
| 2021/0201153 | A1* | 7/2021 | Chae | ........................ G06N 3/048 |
| 2021/0263932 | A1* | 8/2021 | Shaffer | ............... G06F 16/9024 |
| 2021/0279585 | A1* | 9/2021 | Keski-Valkama | ..... G06N 20/00 |
| 2021/0397988 | A1* | 12/2021 | Sarpatwar | ................ G06N 3/04 |

OTHER PUBLICATIONS

Ramachandran, et al., "Searching for Activation Functions," In 6$^{th}$ International Conference on Learning Representations, ICLR 2018, Vancouver, BC, Canada, Apr. 30-May 3, 2018, Workshop Track Proceedings, 2018.

Hendrycks, et al., "Gaussian Error Linear Units (gelus)," arXiv: 1606.08415, 2016, v. 4, 2020.

Klambauer, et al., "Self-Normalizing Neural Networks," 31$^{st}$ Conference on Neural Information Processing Systems (NIPS 2017), 10 pp., 2017.

Bingham, et al., "Evolutionary Optimization of Deep Learning Activation Functions," In Genetic and Evolutionary Computation Conference (GECCO '20), Jul. 8-12, 2020, Cancun, Mexico, 2020, arXiv: 2002.07224v1, Feb. 17, 2020.

Liu, et al., "Evolving Normalization-Activation Layers," arXiv: 2004.02967v5, Jul. 17, 2020.

Basirat, et al., "The Quest for the Golden Activation Function," arXiv: 1808.00783v1, Aug. 2, 2018.

India Patent Office Examination Report, App. No. 202347005979, Jan. 30, 2023.

Extended European Search Report issued in App. No. 21856629.7, Jul. 23, 2024, 12 pages.

Bingham, Garrett et al: "Discovering Parametric Activation Functions", Arxiv.Org, Cornell University Library, 201 Olin Library Cornell University Ithaca, NY 14853, Jun. 5, 2020.

Bingham, Garrett et al: "Evolutionary Optimization Of Deep Learning Activation Functions", Proceedings Of The 2020 Genetic And Evolutionary Computation Conference, ACMpub27, New York, NY, USA, Jun. 25, 2020.

\* cited by examiner

SYSTEM AND METHOD FOR GENERATING PARAMETRIC ACTIVATION FUNCTIONS

CROSS REFERENCE TO RELATED APPLICATIONS

The present application claims the benefit of priority to U.S. Provisional Patent Application No. 63/064,483, "SYSTEM AND METHOD FOR GENERATING PARAMETRIC ACTIVATION FUNCTIONS" which was filed on Aug. 12, 2020 and which is incorporated herein by reference in its entirety.

The following publication is also incorporated herein by reference in its entirety: Bingham et al., Discovering Parametric Activation Functions, published at arXiv 2006.03179v4 [cs.LG] 30 Jan. 2021.

Additionally, one skilled in the art appreciates the scope of the existing art which is assumed to be part of the present disclosure for purposes of supporting various concepts underlying the embodiments described herein. By way of particular example only, prior publications, including academic papers, patents and published patent applications listing one or more of the inventors herein are considered to be within the skill of the art and constitute supporting documentation for the embodiments discussed herein.

FIELD OF THE EMBODIMENTS

The subject matter described herein, in general, relates to activation functions used in deep neural network learning architectures, and, in particular, relates to automatic generation of customized parametric activation functions for a given task.

BACKGROUND

On skilled in the art will appreciate the importance of selection of activation functions in designing neural network models. Activation functions in the hidden layer controls how well the neural network model learns on the training dataset and has a significant impact on how well the model performs. Activation functions, also known as transfer functions, define the outputs given an input or set of inputs for the neuron in a neural network. With the exception of relatively recent work discussed below, activation function is a manual selection made by the network designer from a known set of activations functions, each having their own pros and cons.

Activation function design continues to be an active area of research, and a number of novel activation functions have been introduced. The Rectified Linear Unit (ReLU), (ReLU $(x)=\max\{x, 0\}$) is the most commonly-used activation function in modern deep learning architectures. When introduced, it offered substantial improvements over the previously popular tanh and sigmoid activation functions. Because ReLU is unbounded as $x \rightarrow \infty$ it is less susceptible to vanishing gradients than tanh and sigmoid. It is also simple to calculate, which leads to faster training times.

Many novel activation functions have been explored, each with different properties. In certain settings, these novel activation functions lead to substantial improvements in accuracy over ReLU, but the gains are often inconsistent across tasks. Because of this inconsistency, ReLU is still the most commonly used: it is reliable, even though it may be suboptimal.

The improvements and inconsistencies are due to a gradually evolving understanding of what makes an activation function effective. For example, Leaky ReLU allows a small amount of gradient information to flow when the input is negative. It was introduced to prevent ReLU from creating dead neurons, i.e. those that are stuck at always outputting zero. On the other hand, the ELU activation function contains a negative saturation regime to control the forward propagated variance. These two very different activation functions have seemingly contradicting properties, yet each has proven more effective than ReLU in various tasks.

There are also often complex interactions between an activation function and other neural network design choices, adding to the difficulty of selecting an appropriate activation function for a given task. Prior work includes: Ramachandran et al., Searching for activation functions, In 6th International Conference on Learning Representations, ICLR 2018, Vancouver, BC, Canada, Apr. 30-May 3, 2018, Workshop Track Proceedings, 2018, which warned that the scale parameter in batch normalization should be set when training with the Swish activation function; Hendricks et al., Gaussian error linear units (gelus), arXiv:1606.08415, 2016, suggesting use of an optimizer with momentum when using GELU; and Klambauer et al., Self-normalizing neural networks Advances in neural information processing systems, pages 971-980, 2017, introduced a modification of dropout called alpha dropout to be used with SELU. These results suggest that significant gains are possible by designing the activation function properly for a network and task, but that it is difficult to do so manually.

There have been attempts to use evolution to discover activation functions. Bingham et al., Evolutionary optimization of deep learning activation functions, In Genetic and Evolutionary Computation Conference (GECCO '20), Jul. 8-12, 2020, Cancun, Mexico, 2020, discovered functions with a fixed graph space. Liu et al., Evolving normalization-activation layers, arXiv:2004.02967, 2020, evolved normalization-activation layers to replace both batch normalization and ReLU in multiple neural networks. However, experiments in this paper show that carefully designed parametric activation functions can in fact be a powerful augmentation to existing deep learning models. Also, Basirat et al., The quest for the golden activation function, arXiv:1808.00783, 2018, used a genetic algorithm to discover task-specific piecewise activation functions. However, the discovered activation functions did not outperform ELiSH and Hard-ELiSH, two hand-designed activation functions proposed in the same paper.

Learnable activation functions (LAFs) encode functions with general functional forms such as polynomial, rational, or piecewise linear, and utilize gradient descent to discover optimal parameterizations during training. The general forms allow most LAFs to approximate arbitrary continuous functions. However, just because a given LAF can represent an optimal activation function does not guarantee that gradient descent alone will discover it.

Accordingly, in view of the foregoing limitations, there exists a need for achieving significant gains by designing the activation function properly for a network and task, which can be automatically generated and customized to architectures using a larger and flexible search space.

SUMMARY OF EMBODIMENTS

In a first exemplary embodiment, a computer-implemented process for generating one or more activation functions for a neural network, includes: selecting a random population of activation functions from an operator search space comprising a plurality of activation functions; replacing existing activation functions in the neural network with each of a subset of the selected activation functions; training the neural network in a separate training run for each of the activation functions from the subset and assigning a fitness score to each of the activation functions from the subset; creating a child activation function from an activation function having the highest fitness score by applying one or more mutations; parameterizing the child activation function for fine tuning using gradient descent; and updating one or more parameters of the child activation function at every epoch during the gradient descent to create a customized activation function for different locations within the neural network.

In a second exemplary embodiment, a computer-implemented process for generating one or more activation functions for a neural network, includes: creating a population of P candidate activation functions AF from an operator search space, wherein P contains a predetermined number of candidate activation functions having assigned parameters and assigned fitness scores; sampling a predetermined number S of candidate activation functions AF from P, wherein S<P, and the selecting is random; selecting from S a parent candidate activation function $AF_P$, wherein $AF_P$ is the candidate activation function in S with a highest fitness score; creating a child activation function $AF_C$ by applying one or more mutation to $AF_P$; parameterizing the child activation function $AF_C$ prior to training, wherein during training, the parameters are updated at each epoch during backpropagation; training the neural network with the $AF_C$ at a compressed learning rate over a first predetermined number of epochs and assigning a fitness score $F_{AFC}$ to the child activation function $AF_C$; comparing the fitness score $F_{AFC}$ to a predetermined threshold fitness score $F_T$ and if $F_{AFC} \geq F_T$, adding $AF_C$ to P and removing an oldest candidate activation function from P; repeating the sampling, selecting, creating, training and comparing until a predetermined number of candidate activation functions C have been evaluated, wherein C>P; selecting a predetermined number T of candidate activation functions $AF_T$ from a final population $P_F$ in accordance with highest fitness scores, wherein T<S<P; training the neural network with each of the T candidate activation functions $AF_T$ for two independent training runs at uncompressed learning rate for a second predetermined number of epochs, wherein the second predetermined number of epochs is greater than the first predetermined number of epochs; assigning each activation function $AF_T$ an adjusted fitness score; and selecting at least one activation function $AF_T$ having a highest adjusted fitness score.

In a third exemplary embodiment, at least one computer-readable medium storing instructions that, when executed by a computer, perform a process for generating one or more activation functions for a neural network, the process including: selecting a random population of activation functions from an operator search space comprising a plurality of activation functions; replacing existing activation functions in the neural network with each of a subset of the selected activation functions; training the neural network in a separate training run for each of the activation functions from the subset and assigning a fitness score to each of the activation functions from the subset; creating a child activation function from an activation function having the highest fitness score by applying one or more mutations; parameterizing the child activation function for fine tuning using gradient descent; and updating one or more parameters of the child activation function at every epoch during the gradient descent to create a customized activation function for different locations within the neural network.

BRIEF DESCRIPTION OF FIGURES

The patent or application file contains at least one drawing executed in color. Copies of this patent or patent application publication with color drawing(s) will be provided by the Office upon request and payment of the necessary fee.

FIGS. 5(a), 5(b), 5(c), 5(d), 5(e), 5(f), 5(g), 5(h), 5(i) and 5(j) depict adaptation of parametric activation function over time and space, in accordance with a preferred embodiment of the present disclosure, wherein FIGS. 5(a), 5(b), 5(c), 5(d), 5(e) and 5(f) show parameters change during training, resulting in different activation functions in the early and late stages and FIGS. 5(f), 5(g), 5(h), 5(i) and 5(j) show parameters updated separately in each channel, inducing different activation functions at different locations of a neural network.

DETAILED DESCRIPTION OF THE EMBODIMENTS

Figures 1A, 1B:
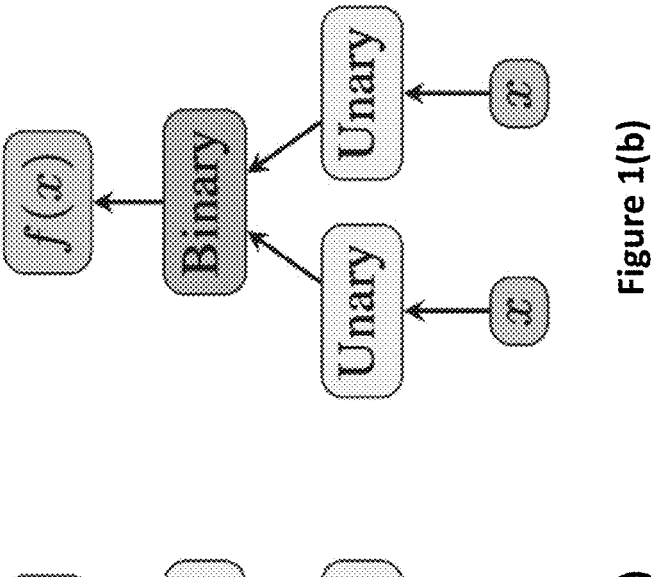
FIGS. 1(a) and 1(b) illustrate random activation function initialization in accordance with a preferred embodiment of the present disclosure.

In describing the preferred and alternate embodiments of the present disclosure, specific terminology is employed for the sake of clarity. The disclosure, however, is not intended to be limited to the specific terminology so selected, and it is to be understood that each specific element includes all technical equivalents that operate in a similar manner to accomplish similar functions. The disclosed embodiments are merely exemplary methods of the invention, which may be embodied in various forms.

Generally, the embodiments herein describe automatic discovery and generation of automatic activation functions which are parametric. Evolution discovers the general form of the function, while gradient descent optimizes the parameters of the function during training. The approach, called Parametric Activation functions generated automatically by an Evolutionary Algorithm, discovers activation functions which improve performance over previous activation functions. As discussed below, the solution described in the embodiments and applied to different architectures (e.g., Wide ResNet, ResNet, and Preactivation ResNet) on the CIFAR-10 and CIFAR-100 image classification datasets, demonstrates the solution's ability to customize activation functions to architectures. It discovers both general activation functions and specialized functions for different architectures, consistently improving accuracy over ReLU and other activation functions by significant margins. The approach can therefore be used as an automated optimization step in applying deep learning to new tasks.

The embodiments of the present disclosure are inspired by genetic programming, which describes techniques for evolving computer programs to solve a particular task. In contrast with the prior art solutions, the present embodiments focus on automatically discovering activation functions that are parametric. Evolution discovers the general form of the function, while gradient descent optimizes the parameters of the function during training. The approach, called PANGAEA (Parametric ActivatioN functions Generated Automatically by an Evolutionary Algorithm), discovers general activation functions that improve performance overall over previously proposed functions.

The present embodiments utilize a flexible search space that includes activation functions of arbitrary shape, is adopted. Also, the present solution includes more powerful mutation operations, and a function parameterization approach that makes it possible to further refine functions through gradient descent. The larger search space in of present solution affords evolution extra flexibility in designing activation functions, while the trainable parameters give customizability to the network itself, leading to consistent, significant improvement.

In accordance with one general embodiment, activation functions are represented as computation graphs in which each node is a unary or a binary operator as exemplified in Table 1 below.

instead. Additionally, if an activation function with greater than seven nodes is selected for mutation, the mutation is a remove mutation. This is done to control bloat.

Figures 3A, 3B, 3C, 3D, 3E:
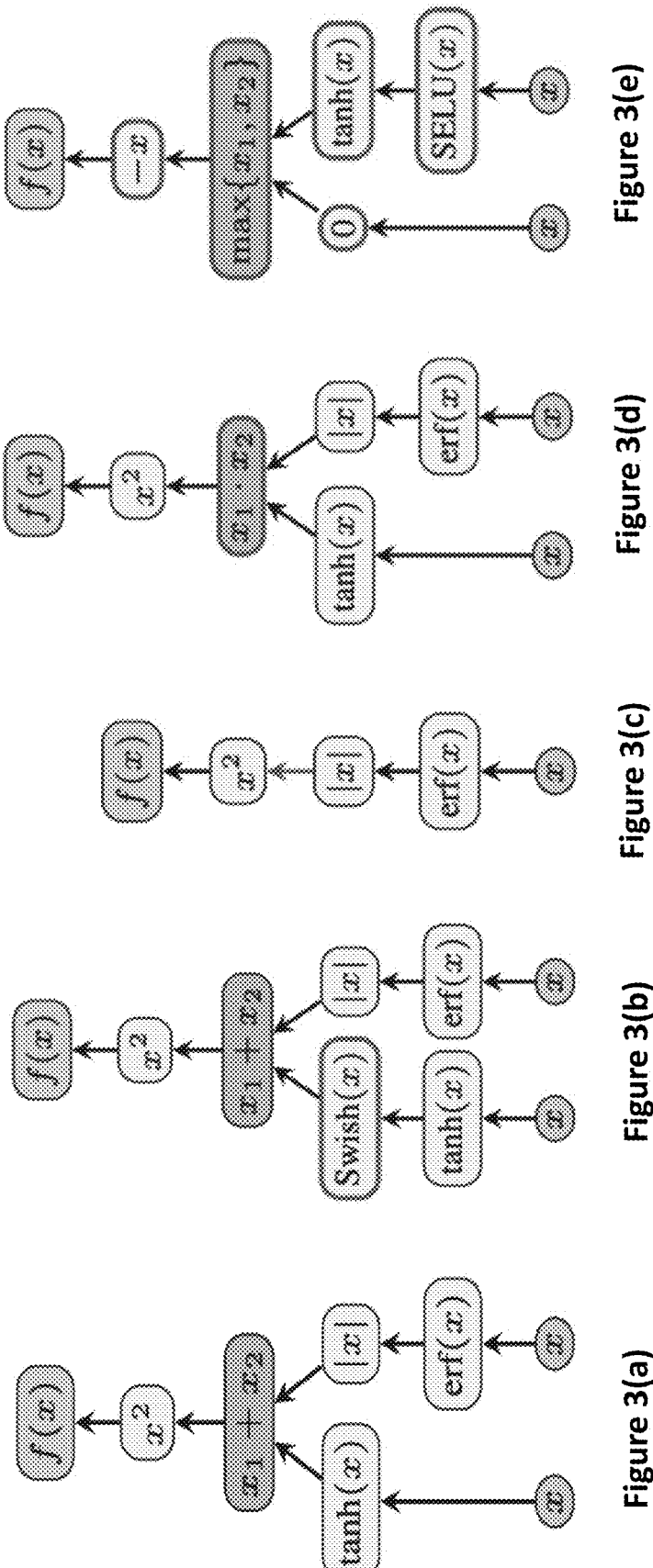
FIGS. 3(a), 3(b), 3(c), 3(d) and 3(e) illustrate evolutionary operations on activation function, in accordance with a preferred embodiment of the present disclosure.

FIGS. 3(a) to (e) show examples of different evolutionary operations on activations functions. FIG. 3(a) exemplifies a parent. In an insert mutation exemplified in FIG. 3(b), one operator in the search space is selected uniformly at random. This operator is placed on a random edge of a parent activation function graph. As shown in FIG. 3(b), the unary operator Swish(x) is inserted at the edge connecting the output of tanh(x) to the input of $x_1+x_2$. After mutating, the parent activation function produces the child activation function. If a binary operator is randomly chosen for the insertion, the incoming input value is assigned to the variable x1. If the operator is addition or subtraction, the input to $x_2$ is set to 0. If the operator is multiplication, division, or exponentiation, the input to $x_2$ is set to 1. Finally, if the operator is the maximum or minimum operator, the input to $x_2$ is a copy of the input to $x_1$. When a binary operator is inserted into a computation graph, the activation function computed remains unchanged.

Next, for a remove mutation exemplified in FIG. 3(c), one node is selected uniformly at random and deleted. The node's input is rewired to its output. If the removed node is

TABLE 1

| | | Unary | | | | | Binary | |
|---|---|---|---|---|---|---|---|---|
| 0 | $|x|$ | erf(x) | tanh(x) | arcsinh(x) | ReLU(x) | Softplus(x) | $x_1 + x_2$ | $x_1^{x_2}$ |
| 1 | $x^{-1}$ | erfc(x) | $e^x - 1$ | arctanh(x) | ELU(x) | Softsign(x) | $x_1 - x_2$ | $\max\{x_1, x_2\}$ |
| x | $x^2$ | sinh(x) | $\sigma(x)$ | bessel i0e(x) | SELU(x) | HardSigmoid(x) | $x_1 \cdot x_2$ | $\min\{x_1, x_2\}$ |
| $-x$ | $e^x$ | cosh(x) | $\log(\sigma(x))$ | bessel i1e(x) | Swish(x) | | $x_1/x_2$ | |

The activation functions are implemented in TensorFlow, and safe operator implementations are chosen when possible according to one exemplary embodiment (e.g. the binary operator $x_1/x_2$ is implemented as tf math.divide_no_nan, which returns 0 if $x_2=0$). The unary and binary operators are chosen to create a large and expressive search space containing activation functions that are unlikely to be discovered by hand. Operators that are periodic (e.g. sin(x)) and operators that contain repeated asymptotes are not included; in preliminary experiments they often caused training instability. All of the operators have domain R, making it possible to compose them arbitrarily.

PANGEA begins with an initial population of P random activation functions. Each function is either of the form f(x)=unary1(unary2(x)) or f(x)=binary(unary1(x); unary2(x)), as shown in FIGS. 1(a) and 1(b). Both forms are equally likely, and the unary and binary operators are also selected uniformly at random. The computation graphs in FIGS. 1(a) and 1(b) thus represent the simplest non-trivial computation graphs with (FIG. 1(b)) and without (FIG. 1(a)) a binary operator.

During the search, all ReLU activation functions in a given neural network are replaced with a candidate activation function. No other changes to the network or training setup are made. The network is trained on the dataset, and the activation function is assigned a fitness score equal to the network's accuracy on the validation set.

Figures 2A, 2B:
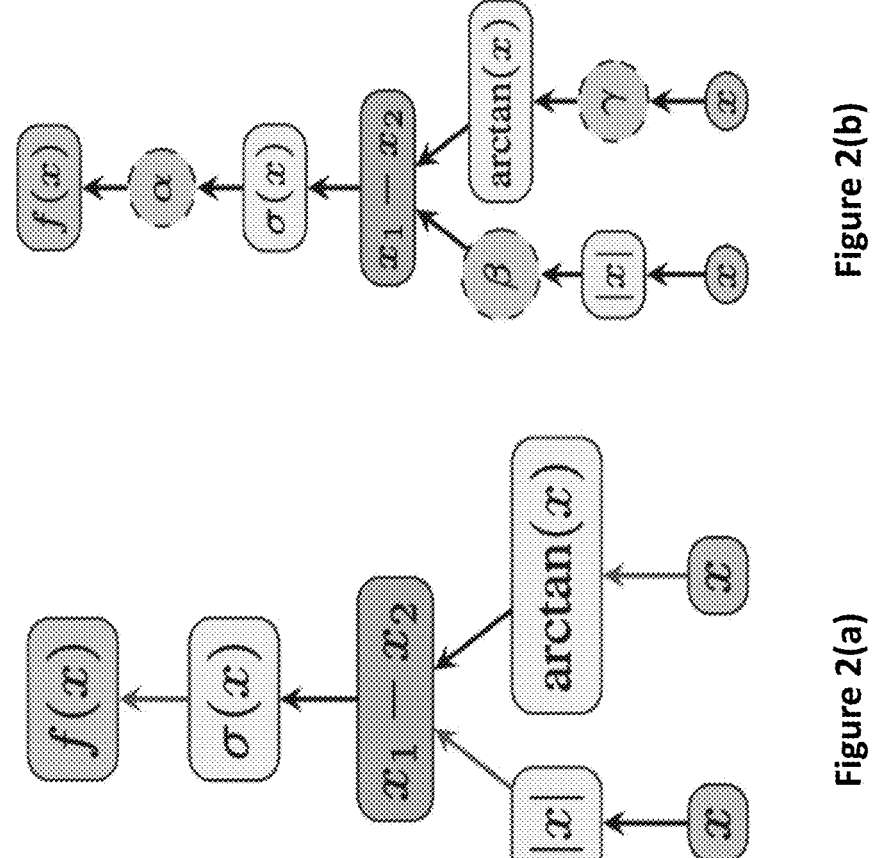
FIGS. 2(a) and 2(b) illustrate parameterization of activation functions in accordance with a preferred embodiment of the present disclosure.

In one exemplary embodiment, given a parent activation function, as shown in FIGS. 2(a) and 2(b), a child activation function is created by applying one of four possible mutations. All mutations are equally likely with two special cases. If a remove mutation is selected for an activation function with just one node, a change mutation is applied binary, one of the two inputs is chosen at random and is deleted. The other input is kept. Referring to FIG. 2(c), the addition operator is removed from the parent activation function. The two inputs to addition, tanh(x) and |erf(x)|, cannot both be kept. By chance, tanh(x) is discarded, resulting in the child activation function $|erf(x)|^2$.

In FIG. 3(d), change mutation is performed, wherein one node in the computation graph is selected at random and replaced with another operator from the search space, also uniformly at random. Unary operators are always replaced with unary operators, and binary operators with binary operators.

In contrast, in a regenerate mutation as shown in FIG. 3(e), every operator in the computation graph is replaced with another operator from the search space for a regenerate mutation. Similar to change mutations, unary operators are replaced with unary operators, and binary operators with binary operators. Although every node in the graph is changed, the overall structure of the computation graph remains the same. Regenerate mutations are useful for increasing exploration, and are similar in principle to burst mutation and delta coding. FIG. 3€ shows the child activation function $-\max\{0, \tanh(SELU(x))\}$, which is quite different from the parent function in FIG. 3(a).

Referring now to FIG. 2(b), after mutation (or random initialization), activation functions are parameterized. A value $k\in\{0; 1; 2; 3\}$ is chosen uniformly at random, and k edges of the activation function graph are randomly selected. Multiplicative per-channel parameters are inserted at these edges and initialized to one. Whereas evolution is well suited for discovering the general form of the activation function in a discrete, structured search space, parameterization makes it possible to fine-tune the function using gradient descent. The function parameters are updated at every epoch during gradient descent, resulting in different activation functions in different stages of training. Since the parameters are per-channel, the process creates different activation functions at different locations in the neural network. Thus, parameterization gives neural networks additional flexibility to customize activation functions, leading to significant increases in accuracy.

In one working embodiment, a regularized evolutionary process for discovering activation functions is described. Initially, P random activation functions are created, parameterized, and assigned fitness scores. To generate a new function, S activation functions are sampled with replacement from the current population. The function with the highest validation accuracy serves as the parent, and is mutated to create a child activation function. This function is parameterized and assigned a fitness score. The new function is then added to the population, and the oldest activation function in the population is removed, ensuring the population is always of size P. This process continues until C activation functions have been evaluated in total, and the top activation functions over the history of the search are returned as a result.

Any activation function that achieves validation accuracy less than a threshold V is discarded. These activation functions are not added to the population, but they do count towards the total number C of activation functions evaluated for each architecture. This quality control mechanism allows evolution to focus only on the most promising candidates.

After evolution is complete, the predetermined number of top activation functions, say for example 10, from the entire search are re-ranked. Each function receives an adjusted fitness score equal to the average validation accuracy from two independent 200-epoch training runs using the original learning rate schedule. The top three activation functions after re-ranking proceed to the final testing experiments. Re-ranking serves two purposes. Full training eliminates any possible bias from the compressed learning rate schedule, and averaging two such runs reduces the impact of activation functions that achieved high accuracy due to chance.

Next, in accordance with one working and exemplary embodiment, CIFAR-100 image classification dataset is chosen. Fifty images from each class are randomly selected from the training set to create a balanced validation set, resulting in a training/validation/test split of 45 K/5 K/10 K images.

Three different neural network architectures are evaluated to test competency of present solution in discovering effectiveness of activation functions in different settings. In the examples herein, the three neural networks include: a wide residual network, a residual network and a preactivation residual network.

The first architecture is a wide residual network of depth 10 and widening factor four (WRN-10-4). Wide residual networks provide an interesting comparison because they are shallower and wider than many other popular architectures, while still achieving impressive results. WRN-10-4 is particularly chosen, though for exemplary purposes, because its accuracy is competitive with other architectures on CIFAR-100, yet it has a relatively low number of parameters, making it fast to train. In the specific example discussed herein, when measuring final performance after evolution, the standard WRN setup is used; all ReLU activations in WRN-10-4 are replaced with the evolved activation function, but no other changes to the architecture are made. The network is optimized using stochastic gradient descent with Nesterov momentum 0.9. The network is trained for 200 epochs; the initial learning rate is 0.1, and it is decreased by a factor of 0.2 after epochs 60, 120, and 160. Dropout probability is set to 0.3, and L2 regularization of 0.0005 is applied to the weights. Data augmentation includes featurewise center, featurewise standard deviation normalization, horizontal flip, and random 32×32 crops of images padded with four pixels on all sides.

During evolution of activation functions for WRN-1004, the training is compressed to save time. By way of example, the network is trained for only 100 epochs; the learning rate begins at 0.1 and is decreased by a factor of 0.2 after epochs 30, 60, and 80. Empirically, the accuracy achieved by this shorter schedule is sufficient to guide evolution; the computational cost saved by halving the time required to evaluate an activation function can then be used to search for additional activation functions.

By comparison, residual network of depth 56 (ResNet-v1-56) provides an important contrast to WRN-10-4. It is significantly deeper and has a slightly different training setup, which may have an effect on the performance of different activation functions. As with WRN-10-4, when measuring final performance with ResNet-v1-56, the only change to the architecture is replacing the ReLU activations with an evolved activation function. The network is optimized with stochastic gradient descent and momentum 0.9. Dropout is not used, and L2 regularization of 0.0001 is applied to the weights. In the original ResNet experiments [14], an initial learning rate of 0.01 was used for 400 iterations before increasing it to 0.1, and further decreasing it by a factor of 0.1 after 32 K and 48 K iterations. An iteration represents a single forward and backward pass over one training batch, while an epoch consists of training over the entire training dataset. In this paper, the learning rate schedule is implemented by beginning with a learning rate of 0.01 for one epoch, increasing it to 0.1, and then decreasing it by a factor of 0.1 after epochs 91 and 137. (For example, (48 K iterations/45 K training images)*batch size of 128≈137.) The network is trained for 200 epochs in total. Data augmentation includes a random horizontal flip and random 32×32 crops of images padded with four pixels on all sides.

When evolving activation functions for ResNet-v1-56, the learning rate schedule is again com-pressed. The network is trained for 100 epochs; the initial warmup learning rate of 0.01 still lasts one epoch, the learning rate increases to 0.1, and then decreases by a factor of 0.1 after epochs 46 and 68. When evolving activation functions, their relative performance is more important than the absolute accuracies they achieve. The shorter training schedule is therefore a cost-efficient way of discovering high-performing activation functions.

Lastly, preactivation residual network of depth 56 (ResNet-v2-56) has identical depth to ResNet-v1-56, but is a fundamentally different architecture. Activation functions are not part of the skip connections, as is the case in ResNet-v1-56. Since information does not have to pass through an activation function, this structure makes it easier to train very deep architectures. The full training setup, data augmentation, and compressed learning rate schedule used during evolution for ResNet-v2-56 are all identical to those for ResNet-v1-56 with one exception: with ResNet-v2-56, it is not necessary to warm up training with an initial learning rate of 0.01, so this step is skipped.

Figure 4:
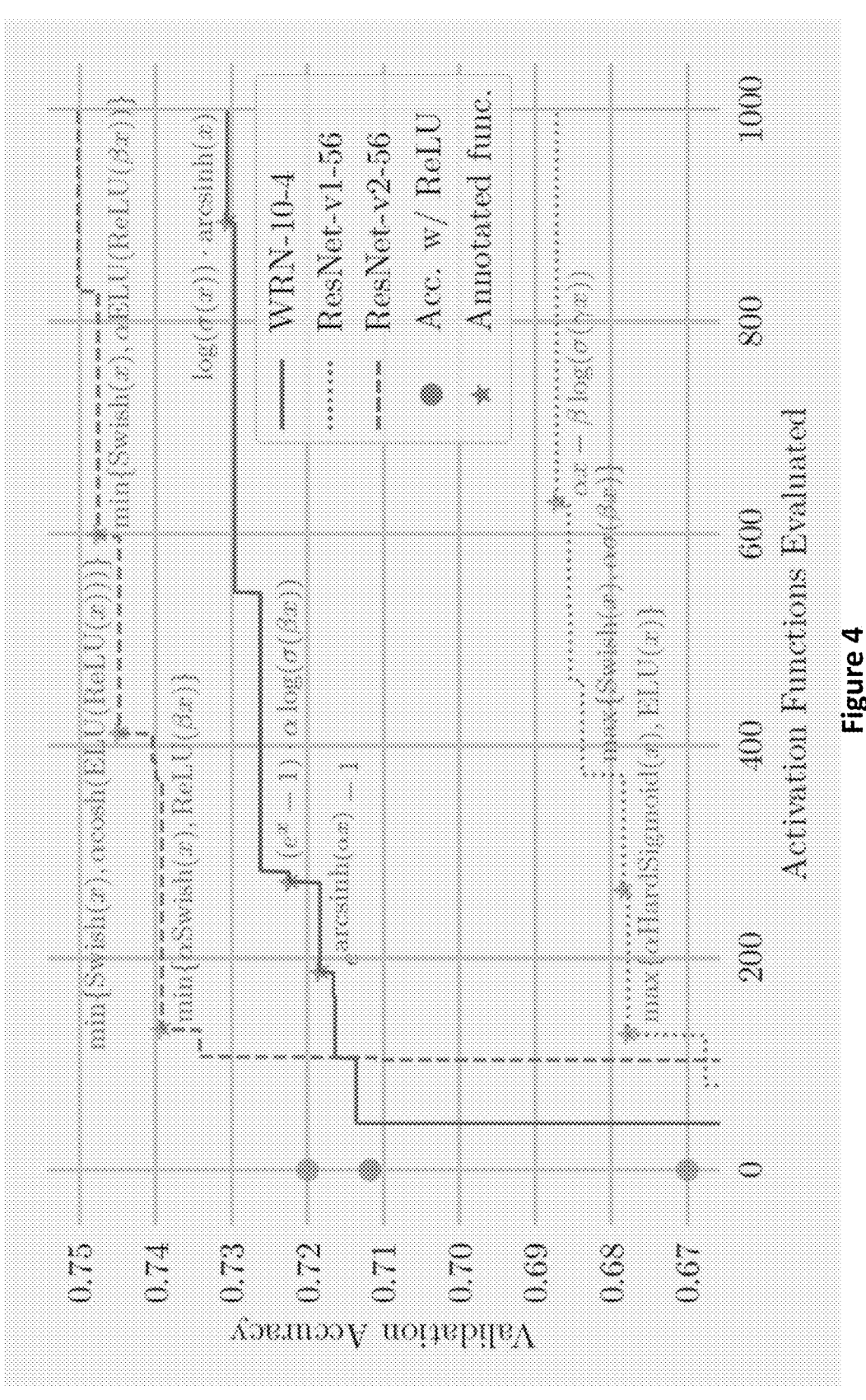
FIG. 4 illustrates progress of the Parametric ActivatioN functions Generated Automatically by an Evolutionary Algorithm (PANGEA) on three different neural networks in accordance with a preferred embodiment of the present disclosure.
Figures 5A, 5B, 5C, 5D, 5E:
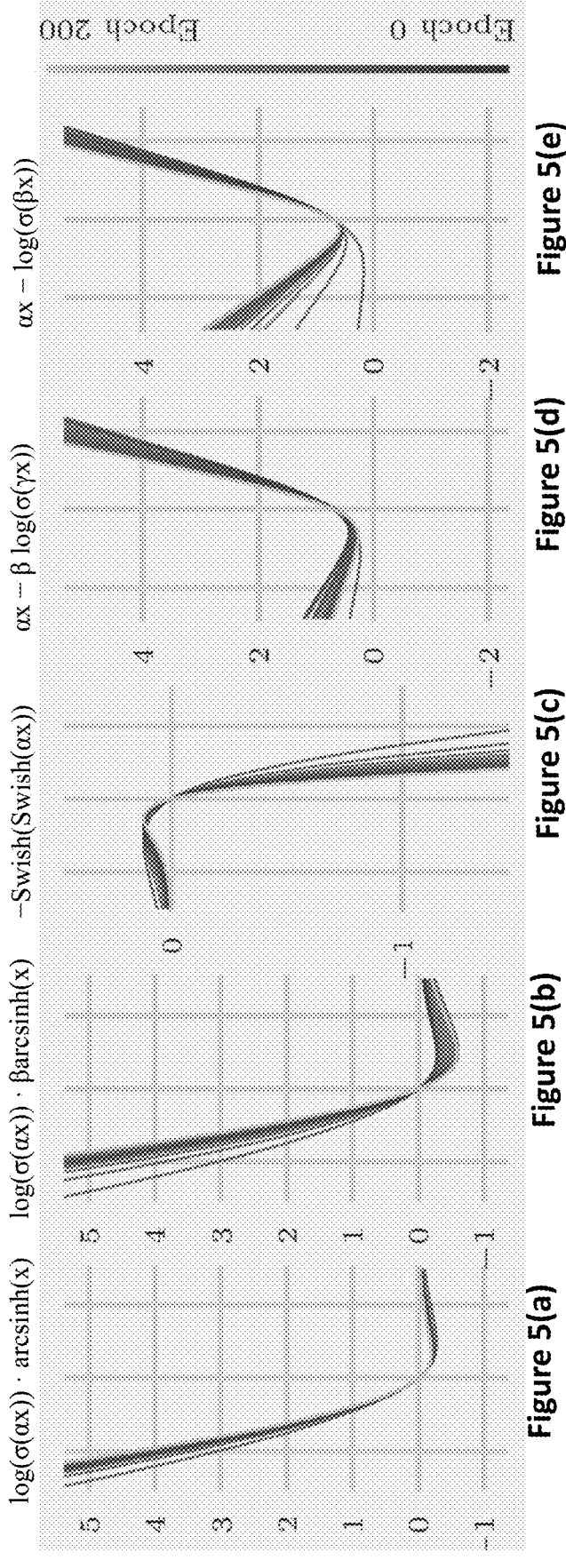
Figures 5F, 5G, 5H, 5I, 5J:
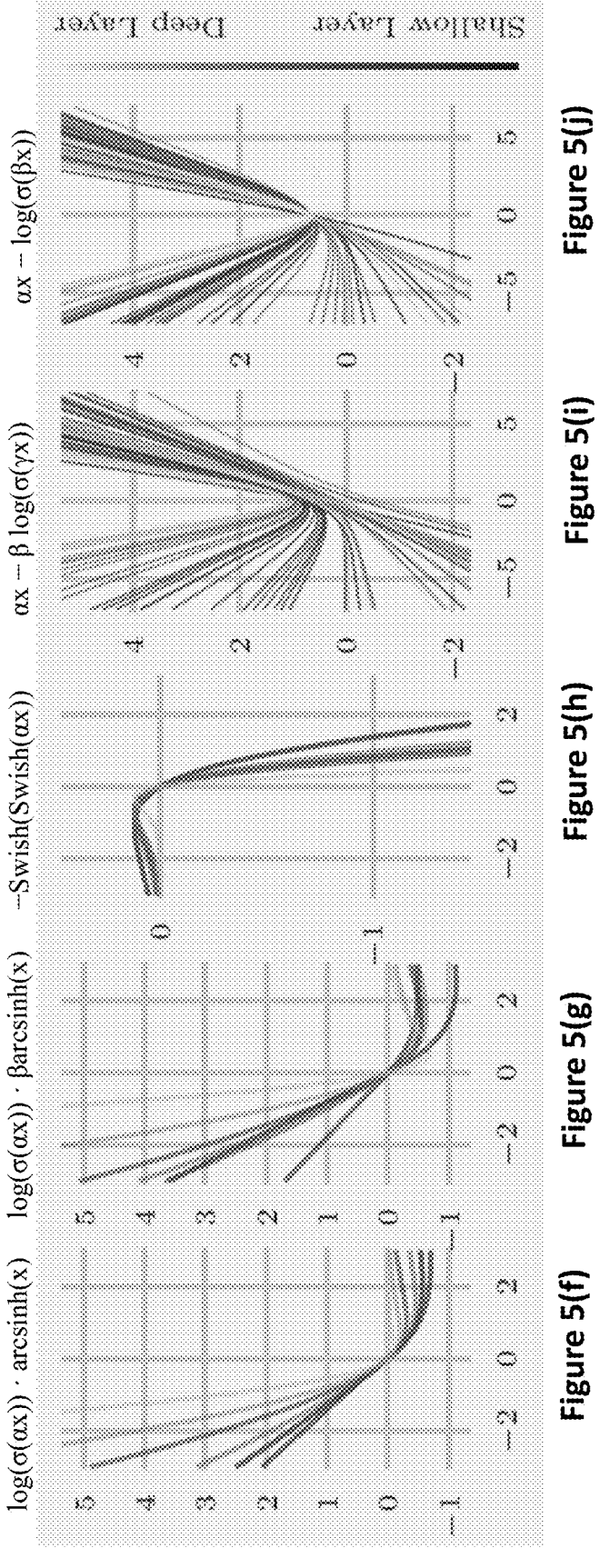

Three separate evolution experiments are run to discover novel activation functions for the three architectures. In one example embodiment, evolutionary parameters P=64, S=16, C=1000, and V=0.2 are used. FIG. 4 visualizes progress in the separate evolution experiments. For all three architectures, the present solution quickly discovers activation functions that outperform ReLU. It continues to make progress, gradually discovering better activation functions. Notably, evolution makes steady progress throughout the run and does not plateau during the time allotted for the experiment. Each run took approximately 2,000 GPU hours on GeForce GTX 1080 GPUs. One skilled in the art will recognize that implementation and computation requirements will vary depending on the time and complexity of evolutionary search. Accordingly, computing needs may be adjusted accordingly.

Table 2 shows the final test accuracy for the top specialized activation functions discovered by PANGAEA in each run. For comparison, the accuracy of the top general functions discovered in this process are also shown, as well as the accuracy of several baseline activation functions. Specifically, Table 2 highlights CIFAR-100 test set accuracy aggregated over ten runs, shown as mean±sample standard deviation. Asterisks indicate a statistically significant improvement in mean accuracy over ReLU, with * if $p \leq 0.05$,  if $p \leq 0.01$, and * if $p < 0.001$; p-values are from one-tailed Welch's t-tests. The top accuracy for each architecture is in bold. In sum, PANGAEA discovered the best activation function for each of the three architectures. The details for baseline activation functions are known to one skilled in the art, described in the literature and provided below:

$$ReLU = \max\{x, 0\}.$$

$$ELiSH = \frac{x}{1 + e^{-x}} \text{ if } x \geq 0 \text{ else } \frac{e^x - 1}{1 + e^{-x}}.$$

$$ELU = x \text{ if } x \geq 0 \text{ else } \alpha(e^x - 1), \text{ with } \alpha = 1.$$

$$GELU(x) = xP(X \leq x) = x\Phi(x)$$
$$\approx 0.5x\left(1 + \tanh\left[\sqrt{2/\pi}\left(x + 0.044715x^3\right)\right]\right).$$

$$HardSigmoid = \max\{0, \min\{1, 0.2x + 0.5\}\}.$$

10

-continued $$\text{Leaky } ReLU = x \text{ if } x \geq 0 \text{ else } 0.01x.$$

$$Mish = x \cdot \tanh(Softplus(x)).$$

$$SELU = \lambda x \text{ if } x \geq 0 \text{ else } \lambda\alpha(e^x - 1),$$

$$\text{with } \lambda = 1.05070098, \ \alpha = 1.67326324.$$

$$\text{sigmoid} = (1 + e^{-x})^{-1}.$$

$$Softplus = \log(e^x + 1).$$

$$Softsign = x / (|x| + 1).$$

$$Swish = x \cdot \sigma(x), \text{ with } \sigma(x) = (1 + e^{-x})^{-1}.$$

$$\tanh(x) = \frac{e^x - e^{-x}}{e^x + e^{-x}}.$$

$$PReLU = x \text{ if } x \geq 0$$

else $\alpha x$, where $\alpha$ is a per-neuron learnable parameter initialized to 0.25.

$$PSwish = x \cdot \sigma(\beta x),$$

where $\beta$ is a per-channel learnable parameter.

$$APL = \max(0, x) + \Sigma_{s=1}^{s} a_i^s \max(0, -x + b_i^s),$$

where S=7 and $a_s$ and $b_s$ are per-neuron learnable parameters.

$$PAU = \frac{\sum_{j=0}^{m} a_j x^j}{1 + \left|\sum_{k=1}^{n} b_k x^k\right|},$$

where m=5, n=4, and $a_j$ and $b_k$ are per-layer learnable parameters initialized so that the function approximates Leaky ReLU with a slope of 0.01.

$$SPLASH = \Sigma_{s=1}^{(S+1)/2} a_s^+ \max\{0, x - b_s\} + a_s^- \max\{0, -x - b_s\},$$

where S=7, b=[0,1,2,2.5], and $a_s^+$ and $a_s^-$ are per-layer learnable parameters initialized as $a_s^+ = 1$ and all other a=0.

TABLE 2

| | WRN-10-4 | ResNet-v1-56 | ResNet-v2-56 |
|---|---|---|---|
| Specialized for WRN-10-4 | | | |
| $\log(\sigma(\alpha x)) \cdot \text{Barcsinh}(x)$ | 73.20 ± 0.37 *** | 18.63 ± 21.04 | 45.88 ± 30.70 |
| $\log(\sigma(\alpha x)) \cdot \text{arcsinh}(x)$ | 73.16 ± 0.41 *** | 19.34 ± 20.14 | 64.30 ± 21.32 |
| -Swish(Swish($\alpha x$)) | 72.49 ± 0.55 *** | 58.86 ± 2.88 | 74.71 ± 0.20 * |
| Specialized for ResNet-v1-56 | | | |
| $\alpha x - \text{Blog}(\sigma(yx))$ | 70.28 ± 0.37 | 71.01 ± 0.64 *** | 74.35 ± 0.45 |
| $\alpha x - \log(\sigma(Bx))$ | 70.47 ± 0.53 | 70.30 ± 0.58 * | 74.70 ± 0.23 * |
| max{Swish(x), 0} | 72.10 ± 0.33 ** | 69.43 ± 0.69 | 74.97 ± 0.25 ** |
| Specialized for ResNet-v2-56 | | | |
| Softplus(ELU(X)) | 71.36 ± 0.34 | 69.96 ± 0.39 | 75.61 ± 0.42 *** |
| min{log($\sigma(x)$), $\alpha$log($\sigma(Bx)$)} | 72.04 ± 0.34 ** | 69.56 ± 0.48 | 75.19 ± 0.39 *** |
| SELU(Swish(x)) | 01.00 ± 0.00 | 01.00 ± 0.00 | 75.02 ± 0.35 ** |
| General Activation Functions | | | |
| max{Swish(x), $\alpha$log($\sigma$(ReLU(x)))} | 72.54 ± 0.26 *** | 69.91 ± 0.37 | 75.20 ± 0.41 *** |
| min{Swish(x), $\alpha$ELU(ReLU(Bx))} | 72.39 ± 0.29 *** | 69.82 ± 0.40 | 75.27 ± 0.38 *** |
| $\log(\sigma(x))$ | 72.33 ± 0.32 *** | 69.58 ± 0.35 | 75.53 ± 0.37 *** |

TABLE 2-continued

| | WRN-10-4 | ResNet-v1-56 | ResNet-v2-56 |
|---|---|---|---|
| Fixed Baseline Functions | | | |
| ReLU | 71.46 ± 0.50 | 69.64 ± 0.65 | 74.39 ± 0.44 |
| ELISH | 01.00 ± 0.00 | 01.00 ± 0.00 | 75.20 ± 0.31 *** |
| ELU | 72.30 ± 0.32 *** | 69.67 ± 0.46 | 74.95 ± 0.30 ** |
| GELU | 71.95 ± 0.35 * | 70.19 ± 0.40 * | 74.86 ± 0.33 ** |
| HardSigmoid | 54.99 ± 1.00 | 32.55 ± 4.06 | 64.90 ± 0.69 |
| Leaky ReLU | 71.73 ± 0.33 | 69.78 ± 0.33 | 74.73 ± 0.35 * |
| Mish | 71.95 ± 0.41 * | 69.88 ± 0.54 | 75.32 ± 0.29 *** |
| SELU | 70.53 ± 0.42 | 68.52 ± 0.29 | 73.79 ± 0.36 |
| sigmoid | 56.10 ± 0.98 | 36.47 ± 3.32 | 66.45 ± 0.92 |
| Softplus | 72.27 ± 0.26 *** | 69.71 ± 0.36 | 75.46 ± 0.52 *** |
| Softsign | 56.30 ± 2.16 | 58.38 ± 0.96 | 69.33 ± 0.39 |
| Swish | 72.26 ± 0.28 *** | 69.68 ± 0.38 | 75.08 ± 0.36 *** |
| tanh | 56.52 ± 1.53 | 63.88 ± 0.38 | 70.44 ± 0.40 |
| Parametric Baseline Functions | | | |
| PRELU | 72.23 ± 0.37 *** | 69.77 ± 0.40 | 75.10 ± 0.53 ** |
| PSwish = x · σ(Bx) | 72.40 ± 0.31 *** | 70.16 ± 0.46 * | 75.39 ± 0.28 *** |
| Learnable Baseline Functions | | | |
| APL | 72.88 ± 0.32 *** | 70.81 ± 0.20 *** | 75.02 ± 0.28 *** |
| PAU | 41.46 ± 22.66 | 01.00 ± 0.00 | 02.38 ± 4.36 |
| SPLASH | 72.16 ± 0.81 * | 01.00 ± 0.00 | 73.45 ± 0.43 |

For all three architectures, there are baseline activation functions that outperform ReLU by statistically significant margins. This result already demonstrates that activation functions should be chosen carefully, and that the common practice of using ReLU by default is suboptimal. Furthermore, the best baseline activation function is different for different architectures, suggesting that specializing activation functions to the architecture is a good approach.

Because PANGAEA uses validation accuracy from a single neural network to assign fitness scores to activation functions, there is selective pressure to discover functions that exploit the structure of the network. The functions thus become specialized to the architecture. They increase the performance of that architecture; however, they may not be as effective with other architectures. Specialized activation function accuracies are outlined in Table 2. To verify that the functions are customized to a specific architecture, the functions were cross-evaluated with other architectures.

PANGAEA discovered two specialized activation functions for WRN-10-4 that outperformed all baseline functions by a statistically significant margin (p≤0.05). The top specialized function on ResNet-v1-56 also significantly outperformed all baseline functions, except APL (for which p=0.19). The top specialized activation function on ResNet-v2-56 similarly significantly outperformed all except Softplus (p=0.25) and PSwish (p=0.09). These results strongly demonstrate the power of customizing activation functions to architectures. With previously proposed activation functions, performance gains relative to ReLU are inconsistent or marginal. In contrast, present solution consistently discovers specialized functions that leads to significant improvements. Previous search spaces that rely on repeated fixed building blocks only have limited representational power. In contrast, present solution utilizes a flexible search space that can represent activation functions in an arbitrary computation graph.

Although the best performance comes from specialization, it is also useful to discover activation functions that achieve high accuracy across multiple architectures. For instance, they could be used initially on a new architecture before spending compute on specialization. A powerful albeit computationally demanding approach would be to evolve general functions directly, by evaluating candidates on multiple architectures during evolution. However, it turns out that each specialized evolution run already generates a variety of functions, many of which are general.

To evaluate whether the PANGAEA runs discovered general functions as well, the top 10 functions from each run were combined into a pool of 30 candidate functions. Each candidate was assigned three fitness scores equal to the average validation accuracy from two independent training runs on each of the three architectures. Candidate functions that were Pareto-dominated, were functionally equivalent to one of the baseline activation functions, or had already been selected as a specialized activation function were discarded, leaving three Pareto-optimal general activation functions.

These functions indeed turned out to be effective as general activation functions. All three achieved good accuracy with ResNet-v1-56 and significantly outperformed ReLU with WRN-10-4 and ResNet-v2-56. However, specialized activation functions, i.e. those specifically evolved for each architecture, still give the biggest improvements.

Many of the top discovered activation functions are compositions of multiple unary operators. These functions do not exist in the core unit search space of Ramachandran et al. [29], which requires binary operators. They also do not exist in the S1 or S2 search spaces proposed by Bingham et al.[4], which are too shallow. The design of the search space is therefore as important as the search algorithm itself. Previous search spaces that rely on repeated fixed building blocks only have limited representational power. In contrast, PANGAEA utilizes a flexible search space that can represent activation functions in an arbitrary computation graph.

Furthermore, while the learnable baseline functions can in principle approximate the functions discovered by PANGAEA, they do not consistently match its performance. PANGAEA utilizes both evolutionary search and gradient descent to discover activation functions, and apparently this combination of optimization processes is more powerful than gradient descent alone.

Referring to FIGS. 5(a)-5(j), examples of parametric activation functions discovered by PANGEA, are shown. As training progresses, gradient descent makes small adjustments to the function parameters α, β and γ, resulting in activation functions that change over time (FIGS. 5a to 5(e)). This result suggests that it is advantageous to have one activation function in the early stages of training when the network learns rapidly, and a different activation function in the later stages of training, when the network is focused on fine tuning. The plots were created by averaging the values of α, β and γ across the entire network at different training epochs.

The parameters α, β and γ, are also learned separately for the different channels, resulting in activation functions that vary with location in a neural network, as shown in FIGS. 5(f) to 5(j). Functions in deep layers (those near the output) are more nonlinear than those in shallow layers (those closer to the input), possibly contrasting the need to form regularized embeddings with the need to form categorizations. In this manner, the present solution customizes the activation functions to both time and space for each architecture. The plots were created by averaging α, β and γ at each layer of the network after the completion of training.

Evolutionary search and gradient descent working in tandem provided a better strategy than either optimization algorithm alone. This is the power of PANGEA. For additional baseline comparisons, two alternative search strategies were used to discover activation functions for WRN-10-4. First, a random search baseline was established by applying random mutations without regard to fitness values. This approach corresponds to setting evolutionary parameters P=1, S=1, and V=0%. Second, to understand the effects of function parameterization, a nonparametric evolution baseline was run. This setting is identical to PANGAEA, except functions are not parameterized. Otherwise, both baselines follow the same setup as PANGAEA, including evaluating C=1,000 candidate functions and reranking the most promising ones as discussed above with respect to PANGEA.

Table 3 shows the results of this experiment, i.e., WRN-10-4 accuracy with different activation functions on CIFAR-100, shown as mean±sample standard deviation across ten runs. Random search is able to discover good functions that outperform ReLU, but the functions are not as powerful as those discovered by PANGAEA. This result demonstrates the importance of fitness selection in evolutionary search. The functions discovered by nonparametric evolution similarly outperform ReLU but underperform PANGAEA. Interestingly, without parameterization, evolution is not as creative: two of the three functions discovered are merely Swish multiplied by a constant. Random search and nonparametric evolution both discovered good functions that improved accuracy, but PANGAEA achieves the best performance by combining the advantages of fitness selection and function parameterization.

TABLE 3

| PANGAEA | |
|---|---|
| log(σ(αx)) • βarcsinh(x) | 73.20 ± 0.37 |
| log(σ(αx)) • arcsinh(x) | 73.16 ± 0.41 |
| −Swish(Swish(αx)) | 72.49 ± 0.56 |
| Random Search | |
| αSwish(x) | 72.85 ± 0.25 |
| Softplus(x) • arctan(αx) | 72.81 ± 0.35 |
| ReLU(αarcsinh(βσ(x)))) •SELU(γx) | 72.69 ± 0.21 |
| Nonparametric Evolution | |
| cosh(1) • Swish(x) | 72.78 ± 0.24 |
| (e¹ − 1) • Swish(x) | 72.52 ± 0.34 |
| ReLU(Swish(x)) | 72.04 ± 0.54 |

TABLE 3-continued

| ReLU | 71.46 ± 0.50 |
|---|---|
| Swish | 72.26 ± 0.28 |

To understand the effect that parameterizing activation functions has on their performance, the specialized functions (Table 2) were trained without them. As Table 4 shows, when parameters are removed, performance drops. The function log(σ(x)) is the only exception to this rule, but its high performance is not surprising, since it was previously discovered as a general activation function (Table 2). These results confirm that the learnable parameters contributed to the success of PANGAEA.

TABLE 4

| WRN-10-4 | |
|---|---|
| log(σ(αx)) • βarcsinh(x) | 73.20 ± 0.37 |
| log(σ(αx)) • arcsinh(x) | 73.16 ± 0.41 |
| log(σ(x)) • arcsinh(x) | 72.51 ± 0.30 |
| −Swish(Swish(αx)) | 72.49 ± 0.56 |
| −Swish(Swish(x)) | 71.97 ± 0.22 |
| ResNet-v1-56 | |
| αx − βlog(σ(γx)) | 71.01 ± 0.64 |
| αx − log(σ(βx)) | 70.30 ± 0.58 |
| x − log(σ(x)) | 69.29 ± 0.45 |
| ResNet-v2-56 | |
| min{log(σ(x)), αlog(σ(βx))} | 75.19 ± 0.39 |
| log(σ(x)) | 75.53 ± 0.37 |

As demonstrated in Tables 2 and 4, learnable parameters are an important component of PANGAEA. An interesting question is whether accuracy can be increased simply by augmenting existing activation functions with learnable parameters. Table 5 shows that this is not the case: trivially adding parameters to fixed activation functions does not reliably improve performance. This experiment implies that certain functional forms are better suited to taking advantage of parameterization than others. By utilizing evolutionary search, PANGAEA is able to discover these functional forms automatically.

TABLE 5

| | WRN-10-4 | ResNet-v1-56 | ResNet-v2-56 |
|---|---|---|---|
| Best Specialized Functions | | | |
| log(σ(αx)) • βarcsinh(x) | 73.20 ± 0.37 | | |
| αx − βlog(σ(γx)) | | 71.01 ± 0.64 | |
| Softplus(ELU(x)) | | | 75.61 ± 0.42 |
| Parameterized Functions | | | |
| αReLU(βx) | 71.96 ± 0.31 | 68.93 ± 0.22 | 73.52 ± 0.27 |
| αELiSH(βx) | 01.00 ± 0.00 | 01.00 ± 0.06 | 73.94 ± 0.33 |
| αELU(βx) | 71.98 ± 0.24 | 69.06 ± 0.37 | 73.97 ± 0.45 |
| αGELU(βx) | 71.96 ± 0.34 | 69.39 ± 0.35 | 73.83 ± 0.24 |
| αHardSigmoid(βx) | 66.70 ± 0.64 | 34.33 ± 0.53 | 65.10 ± 0.40 |
| αLeaky ReLU(βx) | 71.74 ± 0.39 | 69.11 ± 0.47 | 73.44 ± 0.29 |
| αMish(βx) | 72.11 ± 0.31 | 69.51 ± 0.87 | 73.72 ± 0.32 |
| αSELU(βx) | 71.07 ± 0.33 | 68.05 ± 0.30 | 73.37 ± 0.38 |
| αsigmoid(βx) | 66.98 ± 0.66 | 44.40 ± 2.62 | 66.98 ± 0.85 |
| αSoftplus(βx) | 71.73 ± 0.31 | 68.84 ± 0.30 | 73.95 ± 0.37 |
| αSoftsign(βx) | 62.12 ± 0.83 | 09.18 ± 13.75 | 68.87 ± 0.38 |
| αSwish(βx) | 72.26 ± 0.29 | 69.25 ± 0.28 | 73.93 ± 0.22 |
| αtanh(βx) | 63.55 ± 0.50 | 02.92 ± 6.07 | 69.55 ± 0.62 |

PANGAEA discovered specialized activation functions for WRN-10-4, ResNet-v1-56, and ResNet-v2-56. Table 6 shows the performance of these activation functions when paired with the larger WRN-16-8, ResNet-v1-110, and Res-Net-v2-110 architectures.

TABLE 6

| WRN-16-8 | |
| --- | --- |
| log(σ(αx)) • βarcsinh(x) | 78.36 ± 0.17 |
| log(σ(αx)) • arcsinh(x) | 78.34 ± 0.20 |
| −Swish(Swish(αx)) | 78.00 ± 0.35 |
| ReLU | 78.15 ± 0.03 |
| ResNet-v1-110 | |
| αx − βlog(σ(γx)) | 70.85 ± 0.50 |
| αx − log(σ(βx)) | 70.34 ± 0.60 |
| max{Swish(x), 0} | 70.36 ± 0.56 |
| ReLU | 71.23 ± 0.25 |
| ResNet-v2-110 | |
| Softplus(ELU(x)) | 77.14 ± 0.38 |
| min{log(σ(x)), αlog(σ(βx))} | 76.93 ± 0.19 |
| SELU(Swish(x)) | 76.96 ± 0.14 |
| ReLU | 76.34 ± 0.11 |

Two of the three functions discovered for WRN-10-4 outperform ReLU with WRN-16-8, and all three functions discovered for ResNet-v2-56 outperform ReLU with Res-Net-v2-110. Interestingly, ReLU achieves the highest accuracy for ResNet-v1-110, where activation functions are part of the skip connections, but not for ResNet-v2-110, where they are not. Thus, it is easier to achieve high performance with specialized activation functions on very deep architectures when they are not confounded by skip connections. Notably, ResNet-v2-110 with Softplus(ELU(x)) performs comparably to the much larger ResNet-v2-1001 with ReLU (77.14 vs. 77.29, as reported in the prior art.

Evolving novel activation functions can be computationally expensive. The results in Table 6 suggest that it is possible to reduce this cost by evolving activation functions for smaller architectures, and then using the discovered functions with larger architectures.

To verify that PANGAEA is effective with different datasets and types of architectures, activation functions were evolved for the All-CNN-C architecture on the CIFAR-10 dataset. All-CNN-C is quite distinct from the architectures considered above: it contains only convolutional layers, activation functions, and a global average pooling layer, but it does not have residual connections. When measuring final performance with All-CNN-C, the ReLU activation function is replaced with an evolved one, but the setup otherwise mirrors that of the prior art set up as closely as possible. The network is optimized with stochastic gradient descent and momentum 0.9. Dropout probability is 0.5, and L2 regularization of 0.001 is applied to the weights. The data augmentation involves featurewise centering and normalizing, random horizontal flips, and random 32×32 crops of images padded with five pixels on all sides. The initial learning rate is set to 0.01, and it is decreased by a factor of 0.1 after epochs 200, 250, and 300. The network is trained for 350 epochs in total.

During evolution of activation functions, the same training setup was used. It is not necessary to compress the learning rate schedule as was done with the residual networks because All-CNN-C trains more quickly.

As shown in Table 7, PANGAEA improves significantly over ReLU in this setting as well. The accuracy improvement from 88.47% to 92.77% corresponds to an impressive 37.29% reduction in the error rate. This experiment provides further evidence that PANGAEA can improve performance for different architectures and tasks.

TABLE 7

| | |
| --- | --- |
| αReLU(β\|ReLU(γx)\|) | 92.77 ± 0.13 |
| αSwish(x) • cosh(β) | 92.66 ± 0.08 |
| αSwish(βx) | 76.15 ± 34.86 |
| ReLU | 88.47 ± 0.14 |

The foregoing description is a specific embodiment of the present disclosure. It should be appreciated that this embodiment is described for purpose of illustration only, and that those skilled in the art may practice numerous alterations and modifications without departing from the spirit and scope of the invention. It is intended that all such modifications and alterations be included insofar as they come within the scope of the invention as claimed or the equivalents thereof.

The invention claimed is:

1. A computer-implemented process for generating one or more hidden layer activation functions for a deep neural network architecture to improve accuracy of a deep neural network model on performing one or more tasks, comprising:

selecting a random population of activation functions from an operator search space comprising a plurality of hidden layer activation functions, wherein the hidden layer activation functions are computation graphs;

replacing existing hidden layer activation functions in the deep neural network architecture with each of a subset of the selected hidden layer activation functions;

training the deep neural network model on a task-related training data set in a separate training run for each of the hidden layer activation functions from the subset, testing the deep neural network model performance accuracy on a task-related validation data set and assigning a fitness score to each of the hidden layer activation functions from the subset based on the performance accuracy;

further during training, creating a child hidden layer activation function from a hidden layer activation function having the highest fitness score by applying one or more mutations;

parameterizing the child hidden layer activation function for fine tuning using gradient descent wherein the parameterizing includes, choosing a value k∈{0, 1, 2, 3} uniformly at random;

randomly selecting k edges of the child hidden layer activation function computation graph;

inserting multiplicative per-channel parameters at the k edges and initializing to one;

updating one or more parameters of the child hidden layer activation function at every epoch during the gradient descent to create a customized hidden layer activation function for different locations within the deep neural network; and selecting one or more optimal parameterized hidden layer activation functions for use in the deep neural network architecture to improve accuracy of the deep neural network model on one or more tasks.

2. The computer-implemented process of claim 1, wherein the existing hidden layer activation functions in the deep neural network are ReLU activation functions.

3. The computer-implemented process of claim 1, wherein each of the hidden layer activation functions are computation graphs having a form selected from the following group consisting of: f(x)=unary1(unary2(x)) and f(x)=binary(unary1(x), unary2(x)).

4. The computer-implemented process of claim 1, wherein the one or more mutations are selected from the group consisting of: insertion of a new operator; removal of a node; changing of an operator at a node by replacing it with another operator; and replacing every operator by a random operator.

5. A computer-implemented process for generating one or more hidden layer activation functions for a deep neural network architecture to improve accuracy of a deep neural network model on performing one or more tasks, comprising:

creating a population of P candidate hidden layer activation functions AF from an operator search space, wherein P contains a predetermined number of candidate hidden layer activation functions having assigned parameters and assigned fitness scores;

sampling a predetermined number S of candidate hidden layer activation functions AF from P, wherein S<P, and the selecting is random;

selecting from S a parent candidate hidden layer activation function $AF_P$, wherein $AF_P$ is the candidate hidden layer activation function in S with a highest fitness score;

creating a child hidden layer activation function $AF_C$ by applying one or more mutation to $AF_P$;

parameterizing the child hidden layer activation function $AF_C$ prior to training, wherein during training, the parameters are updated at each epoch during back-propagation;

training the deep neural network model with the $AF_C$ on task-related training data sets at a compressed learning rate over a first predetermined number of epochs, testing the deep neural network model's performance accuracy on task-related validation data sets and assigning a fitness score $F_{AFC}$ to the child hidden layer activation function $AF_C$;

comparing the fitness score $F_{AFC}$ to a predetermined threshold fitness score FT and if $F_{AFC} \geq F_T$, adding $AF_C$ to P and removing an oldest candidate hidden layer activation function from P;

repeating the sampling, selecting, creating, training, testing and comparing until a predetermined number of candidate hidden layer activation functions C have been evaluated, wherein C>P;

selecting a predetermined number T of candidate hidden layer activation functions $AF_T$ from a final population $P_F$ in accordance with highest fitness scores, wherein T<S<P;

training the deep neural network model with each of the T candidate hidden layer activation functions $AF_T$ on task-related training data sets for two independent training runs at uncompressed learning rate for a second predetermined number of epochs, wherein the second predetermined number of epochs is greater than the first predetermined number of epochs and testing the deep neural network model's performance accuracy on task-related validation data sets;

assigning each hidden layer activation function $AF_T$ an adjusted fitness score based on the deep neural network model's performance accuracy; and selecting at least one hidden layer activation function $AF_T$ having a highest adjusted fitness score for use in the deep neural network architecture to improve accuracy of a deep neural network model on performing the one or more tasks.

6. The computer-implemented process of claim 5, wherein each of the candidate hidden layer activation functions AF are computation graphs.

7. The computer-implemented process of claim 6, wherein each of the candidate hidden layer activation functions are computation graphs having a form selected from the following group consisting of: f(x)=unary1(unary2(x)) and f(x)=binary(unary1(x), unary2(x)).

8. The computer-implemented process of claim 5, wherein the assigned adjusted fitness score is an average validation accuracy from the two independent training runs of the deep neural network on task-related validation sets.

9. The computer-implemented process of claim 5, wherein the one or more mutations are selected from the group consisting of: insertion of a new operator; removal of a node; changing of an operator at a node by replacing it with another operator; and replacing every operator by a random operator.

10. The computer-implemented process of claim 6, wherein parameterizing the child hidden layer activation function $AF_C$ includes:

choosing a value $k \in \{0, 1, 2, 3\}$ uniformly at random;

randomly selecting k edges of the child hidden layer activation function $AF_C$ computation graph;

inserting multiplicative per-channel parameters the k edges and initializing to one.

11. At least one computer-readable non-transitory medium storing instructions that, when executed by a computer, perform a process for generating one or more hidden layer activation functions for a deep neural network architecture to improve accuracy of a deep neural network model on performing one or more tasks, comprising:

selecting a random population of activation functions from an operator search space comprising a plurality of hidden layer activation functions, wherein the hidden layer activation functions are computation graphs;

replacing existing hidden layer activation functions in the deep neural network architecture with each of a subset of the selected hidden layer activation functions;

training the deep neural network model on a task-related training data set in a separate training run for each of the hidden layer activation functions from the subset, testing the deep neural network model performance accuracy on a task-related validation data set and assigning a fitness score to each of the hidden layer activation functions from the subset based on the performance accuracy;

further during training, creating a child hidden layer activation function from a hidden layer activation function having the highest fitness score by applying one or more mutations;

parameterizing the child hidden layer activation function for fine tuning using gradient descent wherein the parameterizing includes, choosing a value $k \in \{0, 1, 2, 3\}$ uniformly at random;

randomly selecting k edges of the child hidden layer activation function computation graph;

inserting multiplicative per-channel parameters at the k edges and initializing to one;

updating one or more parameters of the child hidden layer activation function at every epoch during the gradient descent to create a customized hidden layer activation function for different locations within the deep neural network; and selecting one or more optimal parameterized hidden layer activation functions for use in the deep neural network architecture to improve accuracy of the deep neural network model on one or more tasks.

12. The at least one computer-readable non-transitory medium of claim 11, wherein the existing hidden layer activation functions in the deep neural network are ReLU activation functions.

13. The at least one computer-readable non-transitory medium of claim 11, wherein each of the hidden layer activation functions are computation graphs having a form selected from the following group consisting of: f(x)=unary 1 (unary2(x)) and f(x)=binary(unary1(x), unary2(x)).

14. The at least one computer-readable non-transitory medium of claim 11, wherein the one or more mutations are selected from the group consisting of: insertion of a new operator; removal of a node; changing of an operator at a node by replacing it with another operator; and replacing every operator by a random operator.

15. The computer-implemented process of claim 1, wherein the one or more tasks is a classification task.

16. The computer-implemented process of claim 5, wherein the one or more tasks is a classification task.

17. The at least one computer-readable non-transitory medium of claim 11, wherein the one or more tasks is a classification task.

\* \* \* \* \*